US005343103A

United States Patent [19]

Aoki et al.

[11] Patent Number: 5,343,103

[45] Date of Patent: Aug. 30, 1994

[54] POWER SUPPLYING UNIT FOR SUBMERGED MOTOR

[75] Inventors: Nobuo Aoki, Kawasaki; Ikuo Aizawa, Yokohama; Keisuke Yokoi, Syowamachi; Hideo Negishi, Hiratsuka, all of Japan

[73] Assignees: Tokyo Gas Co., Ltd.; Furukawa Electric Co., Ltd., both of Toyko, Japan

[21] Appl. No.: 651,413

[22] PCT Filed: Mar. 1, 1990

[86] PCT No.: PCT/JP90/00269

§ 371 Date: Dec. 12, 1990

§ 102(e) Date: Dec. 12, 1990

[87] PCT Pub. No.: WO90/10330

PCT Pub. Date: Sep. 7, 1990

[30] Foreign Application Priority Data

Mar. 3, 1989 [JP] Japan .................................... 1-51064

[51] Int. Cl.[5] ........................ H02K 5/10; H02G 15/02

[52] U.S. Cl. ........................................ 310/87; 310/88; 174/77 R

[58] Field of Search ....................... 310/71, 85, 87, 88; 174/76, 77 R, 93, DIG. 8

[56] References Cited

U.S. PATENT DOCUMENTS 4,434,320 2/1984 Klein et al. ....................... 174/77 R
4,500,263 2/1985 Mohn .................................. 417/360
4,549,105 10/1985 Yamamoto et al. .................. 310/87
5,149,984 9/1992 Schultz et al. ........................ 310/87

FOREIGN PATENT DOCUMENTS 56-56111 5/1981 Japan ..................................... 310/87
56-73121 6/1981 Japan ..................................... 310/87
58-159615 9/1983 Japan ................................ 174/77 R

*Primary Examiner*—Steven L. Stephan
*Assistant Examiner*—Matthew Nguyen
*Attorney, Agent, or Firm*—McGlew and Tuttle

[57] ABSTRACT

Power supplying unit to be used for supplying power to such a load as the motor for driving a submerged pump that scoops liquid out of a tank storing low temperature liquid like LNG and so forth. The power supplying unit has a ceramic sleeve fixed to the flange, a penetrating conductor inserted into this ceramic sleeve, and the ceramic sleeve and the penetrating conductor are coupled air-tightly to each other inside the flange (inside the tank) sealed outside the flange with a bellows of semi-mountain construction in cross section. The bellows has an elasticity and is mounted, when the ceramic sleeve and the penetrating conductor are linearly expanded at the maximum temperature during practical or normal use, or at the temperature slightly higher than the said level. The bellows is mounted between the ceramic sleeve and the penetrating conductor in a state where it is displaced to its maximum length due to its self elasticity. The bellows has been structured in such that it may absorb the reaction force being generated, when the penetrating conductor has linearly expanded, as a compression onto the side of ceramic sleeve for preventing it from acting as an tensile stress.

6 Claims, 5 Drawing Sheets

POWER SUPPLYING UNIT FOR SUBMERGED MOTOR

FIELD OF THE INVENTION

The present invention relates to a power supplying unit which is used for supplying the power to such loads as a motor or so forth, and for driving a submerged pump being used in the case of scooping out of a tank the low temperature liquid like a liquified natural gas (LNG) that is stored inside the tank.

BACKGROUND OF THE INVENTION

Because the submerged pump is inserted into the bottom portion inside the casing which has been vertically lowered inside the tank, the power supplying unit against the motor for driving this pump is installed air-tightly, with use of a flange, to the bulkhead in the boundary area between the casing interior and the atmosphere. Therefore, the unit is subjected to the actions as follows.

a. The unit is subjected to the temperature influence close to the atmospheric temperature in the case that the pump is not put into operation.

b. When the power supply for running the pump is started the penetrating conductor for power supply initially heats up to around 80° to 90° C. When the scooping of low temperature liquid is commenced, the conductor is cooled down sharply by the influence of the low-temperature liquid or gas.

Since the penetrating conductor of power supplying unit is especially and repeatedly subjected to this type of heat influence, the conductor repeats the linear expansion and contraction at each of the occasions. There exists a possibility for breakages to the air-tightly connected area of penetrating conductor because of the stress being generated by this phenomenon. Therefore, in the conventional design, a ceramic sleeve 4 is passed through and fixed to the inside of mount hole 2 of flange 1 which is fitted to the bulkhead "d" of, and replace casing as shown in FIG. 5. Through the ceramic sleeve a penetrating conductor 5 is passed, wherein the ceramic sleeve 4 is air-tightly coupled to the penetrating conductor 5 by use of a silver solder 7 utilizing a metallic plate 6 on the inside of the flange 1 (casing interior). This is done with such a contrivance that no stress may act especially on the ceramic sleeve 4 and the silver solder 7 area having small tensile strengths by putting the outside of flange 1 from the inside of ceramic sleeve 4 under a free situation and by directing the linear expansion and contraction of penetrating conductor 5 toward the outside direction of flange 1.

However, in the event that the ceramic sleeve 4 has been air-tightly connected sealingly to the penetrating conductor 5 only at one location inside the flange in this way, the low temperature liquid or gas may promptly leak out of the inside of casing, resulting in a dangerous situation if any breakage should happen to this sealed area and the airtightness should be damaged.

SUMMARY AND OBJECTS OF THE INVENTION

The present invention in this patent application is proposed for solving the defects of aforementioned conventional art, the first of its objects is to provide the sealingly connected portions between the ceramic sleeve and the penetrating conductor at two locations, inside and outside of the flange, for making the outside seal function and for preventing any leakage even if the sealing property should be lost in the inside sealingly connected portion.

Further, the 2nd of its objects is to provide such a contrivance as preventing the tensile stress influence from being exerted onto the ceramic sleeve side which is especially weak in tensile strength. If the ceramic sleeve should be sealingly connected to the penetrating conductor at two locations inside and outside the flange as described in the 1st object, there may appear a difference in the heat expansion/contraction between the ceramic sleeve side extremely least in heat expansion/-contraction percentage and the penetrating conductor side large in the percentage to the contrary and thereby the stress is concentrated onto the sealingly connected portions of both the components, not only increasing the metallic fatigue in the relevant sealingly connected portions but also causing the tensile stress to the sleeve side.

Additionally, the 3rd object is to prevent the loss of function coming from any icing in the means for achieving the 3rd object in addition to miniaturizing the power supplying unit.

DISCLOSURE OF THE INVENTION

This invention being proposed for achieving the aforementioned objects is structured as follows.

The power supplying unit has a flange to be fitted to the bulk head, a ceramic sleeve airtightly passed through and fitted to the flange and a penetrating conductor which has been inserted into the interior of the ceramic sleeve. One end of penetrating conductor is connected to the power source via the cable and the other end is connected to such a load as the motor or so forth for driving the submerged pump inserted into the bottom portion inside the casing.

In the inside of the flange in the power supplying unit, the ceramic sleeve is air-tightly connected to the penetrating conductor by such a first connection means as brazing and the like.

In the outside, the end of ceramic sleeve is sealed to the penetrating conductor by use of the bellows of semi-mountain or semi-spherical construction in its cross section and made of an elastic material.

The mounting conditions (mounting method) of the aforesaid bellows are as follows.

The bellows must be deformable within a range capable of absorbing by compression/elongation actions due to its own elasticity the difference being generated when the ceramic sleeve and the penetrating conductor linearly expand and contract within the temperature range of practical use or normal operating conditions.

In mounting the bellows between the ceramic sleeve and the penetrating conductor, the ceramic sleeve and the penetrating conductor shall be heated up to the practical use maximum temperature or to the temperature slightly higher than the level for their linear expansions. The bellows shall be fixed in place under the longest or equivalent situation of this displacement amount.

That is to say, the range for the bellows to get displaced (elongated) by itself due to its elasticity shall be set to the same value as to volume for the penetrating conductor to get linearly expanded within the scope of practical use maximum temperature or to a slightly larger value. As a result, the bellows under the atmospheric temperature situation is in the state accumulated in pressure by the contraction of penetrating conductor. For this reason, when the penetrating conductor generates a heat and is linearly expanded upto the range of practical use maximum temperature during the initial period of power supply state, the bellows also gets displaced (elongated) by its own elasticity as the linear expansion proceeds, not only for shrinking the linear expansion reaction force of penetrating conductor through this displacement action and for vanishing the reaction force to the ceramic sleeve side but also for making the compression reaction force acted on the ceramic sleeve by the elasticity inherent to the bellows which has been accumulated in pressure during the linear expansion of penetrating conductor.

In the case that the scooping of low temperature liquid is started and the penetrating conductor is cooled down for its transition to contraction, the bellows gets displaced in pursuit of this contraction. During this occasion, as a matter of course, the force of compression acts on the ceramic sleeve via the bellows.

THE BEST CONFIGURATION FOR EMBODYING THE INVENTION

Figure 1:
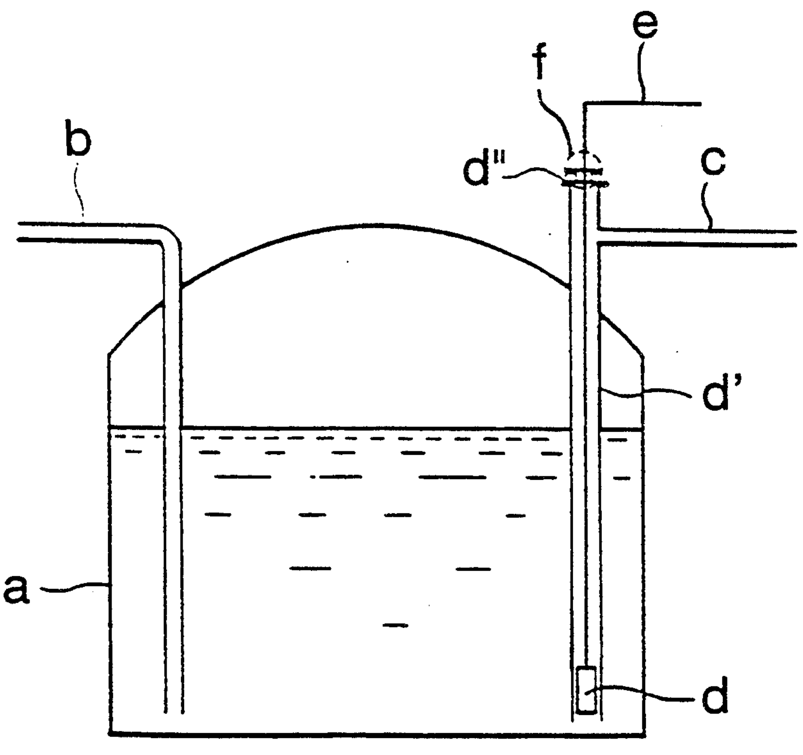
FIG. 1 is an explanatory view showing the LNG storage tank, a casing for scooping the LNG out of the tank, a submerged pump inserted into the bottom portion inside the casing, and a power supplying unit of the motor driven by the submerged pump.

FIG. 1 is an example where the power supplying unit relating to the greatest invention has been embodied to the scooping unit of LNG storage tank. Code "a" is an LNG storage tank, "b" an LNG receiving tube, "c" an LNG scooping tube, "d" a submerged pump which is inserted into the bottom portion of casing "d" that is inserted inside the LNG storage tank "a", "e" a power supplying cable against the motor for driving the submerged pump "d", and "f" a power supplying unit against the motor for driving the submerged pump "d" fixed to the upper portion bulkhead "d" of casing "d'", whereas the said power supplying unit "f" is illustrated in FIG. 2 through FIG. 4.

Figure 2:
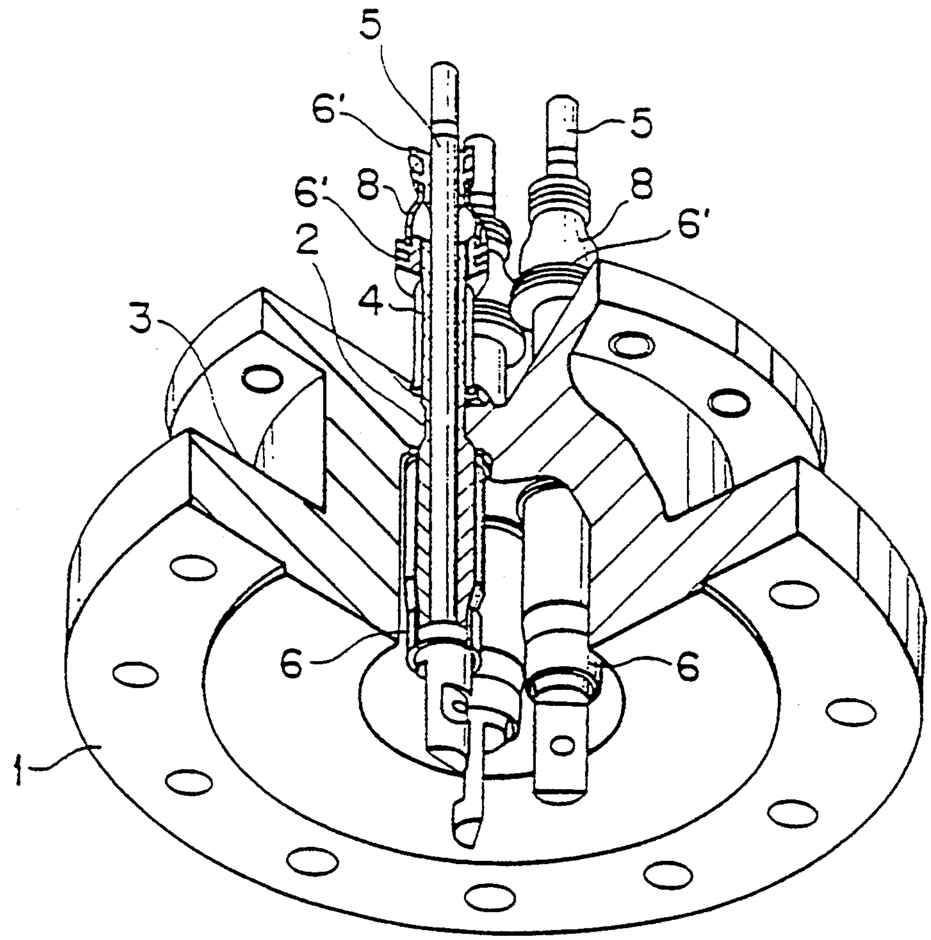
FIG. 2 is a obliquely observed view in the state where a part of the power supplying unit relating to this invention has been cut away so that its interior may be visible.
Figure 3:
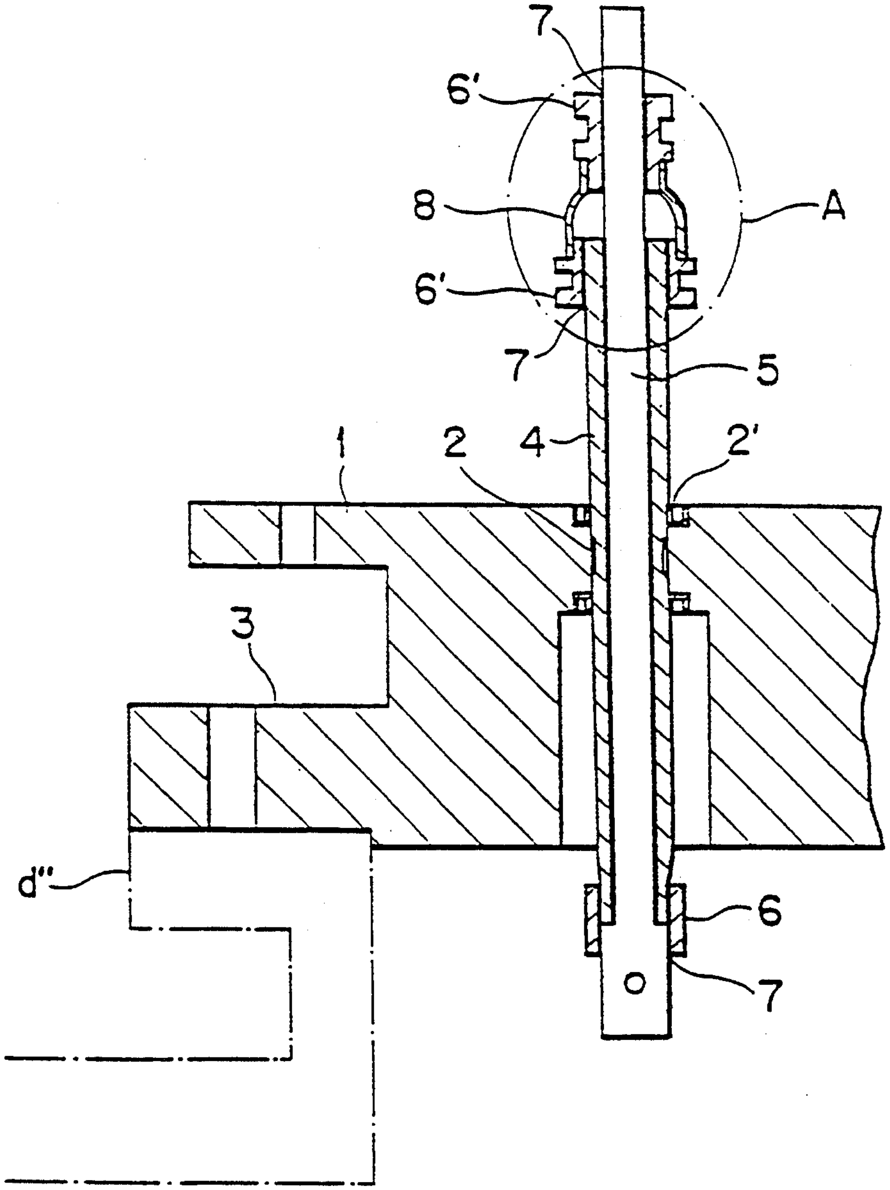
FIG. 3 is an explanatory view showing the relation among the ceramic sleeve, the penetrating conductor and the bellows by cross-sectioning a part of flange and the ceramic sleeve and bellows portions in the power supplying unit.
Figure 4:
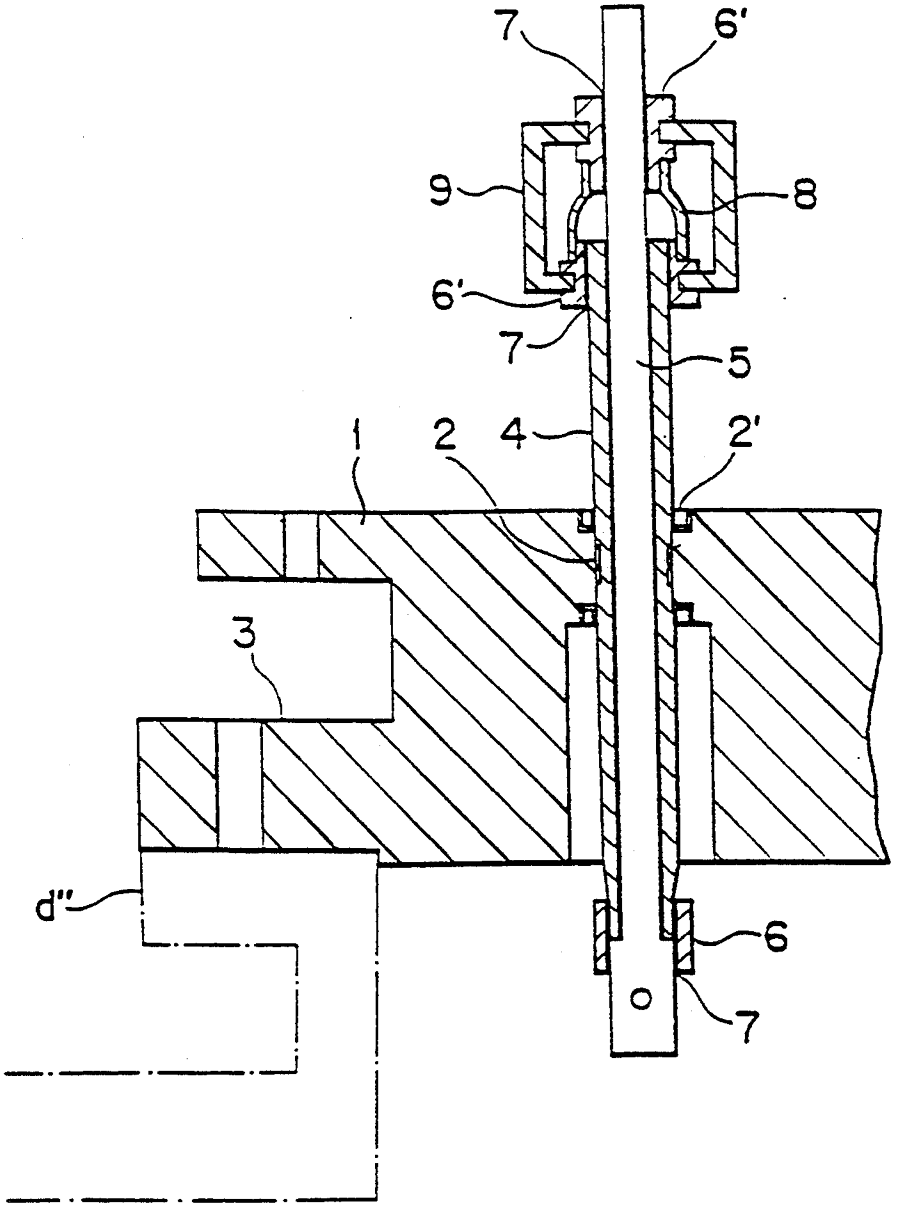
FIG. 4 is a explanatory view showing the work situation of mounting the bellows between the ceramic sleeve and the penetrating conductor in the power supplying unit.
Figure 5:
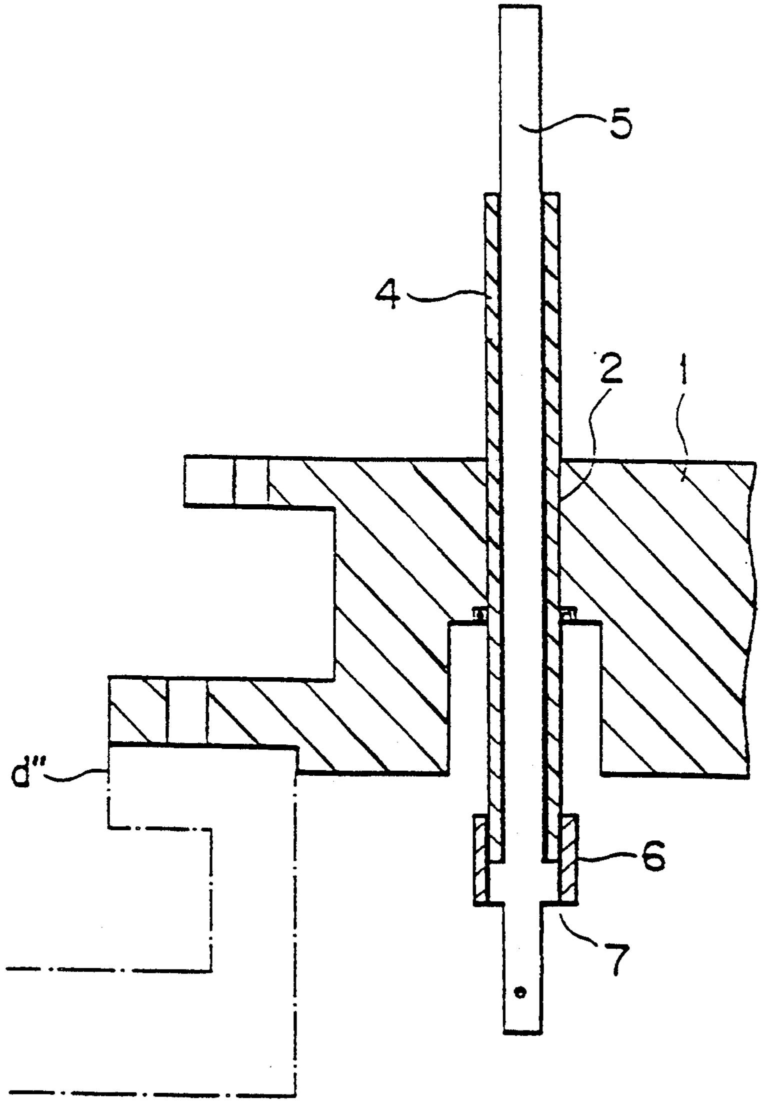
Fig. 5 (PRIOR ART)
FIG. 5 is a cross sectional view of conventional power supplying units.

Numeral 1 in FIG. 2 through FIG. 4 denotes a flange, and a sleeve inserting port 2 is provided to this flange 1. A fixation portion 3 is formed on the outside circumference, of flange 1 where H is fitted to the bulkhead "d'" of casing "d'" at this fixation portion 3.

Numeral 4 is a ceramic sleeve, and this ceramic sleeve 4 has a plural number of metal plate rings 2′ sealingly fitted to its outside circumference. The ceramic sleeve 4 is inserted into a sleeve inserting port 2 and the via these metal plate rings 2′ metal plate rings are air-tightly fixed on both the inside and outside faces of flange 1.

Numeral 5 represents a penetrating conductor inserted into the ceramic sleeve 4. It is brazed air-tightly by a first connection means utilizing a silver solder, to the ceramic sleeve 4 by use of a metal plate 6 on the inside of flange 1 (inside the casing "d'") record connection means includes a bellows 8 of semi-mountain shape (semi-spherical shape) in its cross section which is fitted with both-end metal fitting 6′ on both its ends in an air tight manner to the conductor and sleeve on its outside of flange 1 (on the atmosphere side). Numeral 7 is a silver solder which connects the both end metal fittings 6′ to the ceramic sleeve 4 and the penetrating conductor 5.

For information, the bellows 8 is connected, in welding, to the both-end metal fitting 6′.

Next, the bellows 8 mounting conditions are to be explained hereunder.

The bellows 8 can be displaced within the range of linear expansion and contraction in the temperature range of penetrating conductor 5 during practical or normal use (in the order from −162° C. to 100° C. in the case of the submerged pump "d" quoted in the embodiment). When fixing the bellows 8 between the ceramic sleeve 4 and the penetrating conductor 5 utilizing the both-end metal fitting 6′, the penetrating conductor 5 should be heated to the temperature level of around 100° C. for its linear expansion and the bellows 8 should be linearly expanded or stretched to the point where it is in its longest or equivalent state due to its elasticity.

FIG. 4 is a view showing an example of the methods for fixing the bellows 8 by use of a silver solder 7, where the silver solder 7 is deposited to the insides of metal plate 6 and both-end metal fitting 6′, and with the bellows 8 kept elongated to the maximum length of its elasticity. The bellows 8 in its elongated situation can be fixed by use of a jig 9. The bellows in this situation shall be inserted into a heating furnace and shall be heated to around 800° C. The ceramic sleeve 4 and the penetrating conductor 5 linearly expand through this heating, but because the linear expansion of the penetrating conductor 5 is larger than that of ceramic sleeve 4, the penetrating conductor 5 elongates by sliding inside the both-end metal fitting 5′ is located on its outside.

Because the silver solder 7 gets fused at the temperature of around 780° C., this situation shall be maintained for about 15 minutes before the temperature inside the furnace is lowered. The silver solder 7 gets solidified in the lowering of this temperature, and the ceramic sleeve 4 is coupled (adhered) to the penetrating conductor 5 with use of the metal plate 6 on the inside of flange 1 while the both-end metal fittings 6′ are adhered respectively to the ceramic sleeve 4 and the penetrating conductors 5 on the outside of flange. As a result, the bellows 8 is fitted to the area between the ceramic sleeve 4 and the penetrating conductor 5.

The jib 9 shall be disconnected from the both-end metal fittings 6′ at the atmosphere inside the furnace which has fallen down to around 100° C., namely to the level slightly higher than the maximum temperature under practical or normal use, for freeing the penetrating conductor 5 and thereafter for leaving it alone for its natural shrinkage.

Therefore, the penetrating conductor 5 is prevented from its contraction between the metal plate 6 and the bellows 8 until the temperature inside the furnace falls down to around 100° C., and the penetrating conductor remains in its elongated situation. After the jib 9 has been disconnected, the penetrating conductor 5 re-continues its shrinkage until its temperature level reaches the atmospheric temperature, but the displacement level of bellows 8 still stays within the tolerable range though it follows the contraction of the components.

For reference, though the jig 9 has been removed at the temperature around 100° C. in the case of this embodiment, this is the value taking into account the design safety against the conductor temperature from 80° C. to 90° C. when the power supply has been started.

The power supplying unit "f" is assembled in this way at a factory. The unit is bolted, with the side of bellows 8 being directed upward (the atmosphere side) to the bulkhead "d'''" of casing "d'" of submerged pump "d" utilizing the fixation portion 3 of flange 1 as shown in FIG. 1, whereas the power supplying cable "e" is connected to the penetrating conductor 5.

When the operation of submerged pump "d" is started, the LNG goes up inside the casing "d'" and is discharged from the side of scooping tube "c", but because the LNG has reached the inside of flange 1 during this occasion, it is subjected to the cold temperature at −162° C. where the ceramic sleeve 4 and the penetrating conductor 5 get contracted, and especially the penetrating conductor 5 which gets contracted to the maximum value during practical or normal use. In this case, because the penetrating conductor 5 is fixed to the inside of flange 1 with use of the metal plate 6, its contraction is resisted by the elasticity of bellows 8 on the side of external bellows 8. The bellows 8 gets displaced and follows this contraction, but this followability stays within the permissible displacement range of bellows 8. By this action, the shrinkage force of penetrating conductor 5 acts as a compression force onto the ceramic sleeve 4 via the bellows 8.

Secondly, when the operation of submerged pump "d" has been stopped, the entirety of power supplying unit "f" goes up in temperature to the atmospheric temperature. As a result, the ceramic sleeve 4 and the penetrating conductor 5 linearly expand for gradually releasing the compression (displacement) of bellows 8. The linear expansion stops at the atmospheric temperature, but even in this occasion, the dislacement of bellows 8 remains within the tolerable range on the maximum side. As a result, the elasticity (return) reaction force of bellows 8 is transmitted to the ceramic sleeve 4 while it gradually decreases, and acts as a compression force onto the ceramic sleeve 4.

INDUSTRIAL UTILIZATION POSSIBILITY

The present invention has the industrial utilization possibility as described below.

a. Because the ceramic sleeve and the penetrating conductor are sealed doubly on the inside and outside of flange, the outside sealing property functions with no fear for the leakage of liquid or gas and the unit is safe even if the inside sealing property should be damaged.

b. Not only the ceramic sleeve and the penetrating conductor are sealed by the bellows on the outside of flange but the said bellows is also fixed between the ceramic sleeve and the penetrating conductor, within the range of displacing to the maximum length due to its elasticity, at the location where the penetrating conductor has linearly expanded at the practical use maximum temperature or at the location slightly larger than the abovementioned. As a result, because, for example, in brazing the bellows within a heating furnace, the dislacement level in the contraction portion from about 700° C. where the solder gets solidified down to, for instance, 100° C. which is the practical use maximum temperature taking into account its safety can be disregarded, the bellows can be miniaturized and moreover the power supplying unit can be miniaturized by the portion.

c. The bellows as an elasticity and is moreover fixed in the maximumly elongated (displaced) state or the situation closer to the state to the area between the ceramic sleeve and the penetrating conductor. As a result, not simply when the penetrating conductor shrinks but also when it linearly expands, the bellows absorbs the linear expansion of the penetrating conductor, and furthermore the reaction force being generated when the bellows elongates due to its elasticity acts, as compression, against the ceramic sleeve. Namely, because all the reaction forces act as compressions against the ceramic sleeve, there is no possibility for the ceramic sleeve to get damaged.

d. Because the displacement level of bellows becomes extremely smaller, the bellows can be designed to a semi-mountain structure. Consequently, if the bellows has a valley area, icing may appear to this valley portion to hinder its action, especially the contraction action, but no ice adhere to the bellows having a semi-mountain structure, and moreover can be removed without any difficulty, so there is no fear for the contraction action to be hindered.

For information, the power supplying unit in accordance with this invention can be utilized in a wide range as another power supplying unit for supplying the power to the other loads, passing through the bulkhead, in addition to the supply of power to the motor for driving the submerged pump.

We claim:

1. A power supplying unit comprising:

a flange having a first side and a second side;

a ceramic sleeve passing through said flange from said first side to said second side, an outside of said ceramic sleeve being sealed to said flange in an air tight manner, said ceramic sleeve having a length expanding and contracting with temperature;

a conductor passing through said ceramic sleeve from said first side of said flange to said second side of said flange, said conductor having a length expanding and contracting with temperature;

first connection means for connecting said conductor to said ceramic sleeve in an air tight manner on said first side of said flange;

second connection means for connecting said conductor to said ceramic sleeve in an air tight manner on said second side of said flange, said second connection means including a bellow made of elastic material and having a semi-spherical structure in cross section, said bellow being deformable by a maximum difference in said length of said conductor and said ceramic sleeve, said bellow being in a substantially maximum expansion state and connected to said ceramic sleeve and said conductor when said difference in said length of said conductor and said ceramic sleeve is a maximum during normal operating conditions.

2. A power supply unit in accordance with claim 1, wherein:

said maximum difference in said length of said conductor and said ceramic sleeve is at a maximum operating temperature of said conductor and said ceramic sleeve;

said bellow in said substantially maximum expansion state is connected to said conductor and said ceramic sleeve when said conductor and said sleeve is in a temperature range equal to or higher than said maximum operating temperature.

3. A power supply unit in accordance with claim 1, wherein:

said first connection means includes a metal plate brazed to said conductor and said ceramic sleeve with silver solder;

said bellow includes a metal fitting brazed to said conductor with silver solder and another metal fitting brazed to said ceramic sleeve with silver solder.

4. A power supply unit in accordance with claim 1, wherein:

said flange is connected to a bulkhead and said conductor is connected to a motor for a submerged pump on said first side of said flange.

5. A power supply unit in accordance with claim 1, wherein:

said conductor is an electrical conductor.

6. A power supply unit in accordance with claim 1, wherein:

said bellow always applied a compression force on said ceramic sleeve during changes in length of said conductor and said ceramic sleeve.

* * * * *